(12) United States Patent
Wang et al.

(10) Patent No.: US 10,198,981 B2
(45) Date of Patent: Feb. 5, 2019

(54) PIXEL STRUCTURE AND DISPLAY DEVICE

(71) Applicant: BOE Technology Group Co., Ltd., Beijing (CN)

(72) Inventors: Qiangtao Wang, Beijing (CN); Hyun Sic Choi, Beijing (CN); Yun Sik Im, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 153 days.

(21) Appl. No.: 14/768,664

(22) PCT Filed: Apr. 14, 2015

(86) PCT No.: PCT/CN2015/076553
§ 371 (c)(1),
(2) Date: Aug. 18, 2015

(87) PCT Pub. No.: WO2016/033971
PCT Pub. Date: Mar. 10, 2016

(65) Prior Publication Data
US 2016/0253940 A1    Sep. 1, 2016

(30) Foreign Application Priority Data
Sep. 3, 2014  (CN) .......................... 2014 1 0445915

(51) Int. Cl.
G09G 3/20       (2006.01)
G02F 1/1343    (2006.01)
G02F 1/1362    (2006.01)

(52) U.S. Cl.
CPC ......... *G09G 3/2003* (2013.01); *G02F 1/1343* (2013.01); *G02F 1/1362* (2013.01);
(Continued)

(58) Field of Classification Search
CPC ............... G09G 3/2003; G09G 3/2074; G09G 2300/0439; G09G 2300/0443; G09G 2300/0452
See application file for complete search history.

(56) References Cited

U.S. PATENT DOCUMENTS 4,567,510 A * 1/1986 Tanaka .................. H04N 9/045
                                                       348/223.1
8,164,605 B2   4/2012 Hsieh
(Continued)

FOREIGN PATENT DOCUMENTS

CN   101336443 A   12/2008
CN   103440823 A   12/2013
(Continued)

OTHER PUBLICATIONS

Mar. 4, 2016—(CN)—First Office Action Appn 201410445915.3 with English Tran.
(Continued)

*Primary Examiner* — David Tung
(74) *Attorney, Agent, or Firm* — Banner & Witcoff, Ltd.

(57) ABSTRACT

A pixel structure and a display device are provided. The pixel structure includes: a plurality of pixel units arranged in a matrix, each pixel unit including first to seventh subpixels arranged sequentially in a row direction, and the first subpixel, the second subpixel, the third subpixel and the fourth subpixel being different from one another in color. Each subpixel among the first to third subpixels has a same color as that of one subpixel among the fifth to the seventh pixels, respectively. The number of colors of the pixel structure becomes from original three to at least four, added subpixels are shared by pixels on both sides thereof, colors illustrated are more diversified by color modulation, and gamut of the display device is improved.

12 Claims, 2 Drawing Sheets

(52) U.S. Cl.
CPC ............. *G09G 3/20* (2013.01); *G09G 3/2074* (2013.01); *G09G 2300/0443* (2013.01); *G09G 2300/0452* (2013.01); *G09G 2320/0666* (2013.01)

(56) References Cited

U.S. PATENT DOCUMENTS

| | | | |
|---|---|---|---|
| 2008/0316235 A1* | 12/2008 | Okazaki | G02F 1/133514 345/694 |
| 2009/0051638 A1* | 2/2009 | Horiuchi | G09G 3/2003 345/88 |
| 2011/0181635 A1 | 7/2011 | Kabe et al. | |
| 2012/0062824 A1 | 3/2012 | Lee et al. | |
| 2012/0262362 A1 | 10/2012 | Uehara et al. | |
| 2016/0012761 A1 | 1/2016 | Gai et al. | |

FOREIGN PATENT DOCUMENTS

| | | |
|---|---|---|
| CN | 103779388 A | 5/2014 |
| CN | 103794632 A | 5/2014 |
| CN | 103928496 A | 7/2014 |
| CN | 104238221 A | 12/2014 |
| CN | 104269149 A | 1/2015 |
| WO | 2011036975 A1 | 3/2011 |

OTHER PUBLICATIONS

Jun. 30, 2015—International Search Report and Written Opinion Appn PCT/CN2015/076553 with English Tran.
Mar. 26, 2016—(EP) Extended European Search Report Appn 15790433.5.

* cited by examiner

PIXEL STRUCTURE AND DISPLAY DEVICE

The application is a U.S. National Phase Entry of International Application No. PCT/CN2015/076553 filed on Apr. 14, 2015, designating the United States of America and claiming priority to Chinese Patent Application No. 201410445915.3 filed on Sep. 3, 2014. The present application claims priority to and the benefit of the above-identified applications and the above-identified applications are incorporated by reference herein in their entirety.

TECHNICAL FIELD

Embodiments of the invention relate to a pixel structure and a display device.

BACKGROUND

A panel display device includes a plurality of pixels arranged in a matrix, each pixel usually includes subpixels in three colors of red, green and blue, and each subpixel is controlled by a gate line and a data line. The gate line is used for controlling on and off states of the subpixel, and the data line enables the subpixel to display different gray scales by applying different data voltage signals to the subpixel, so as to realize display of a full-color picture.

Along with increase of people's requirements on material culture day by day, people purse higher and higher display qualities of the display device such as color rendition and richness of picture colors; however, colors synthesized only by three primary colors of red, green and blue are limited, and picture gamut is relatively small.

SUMMARY OF THE INVENTION

An embodiment of the invention provides a pixel structure, comprising a plurality of pixel units arranged in a matrix, each of the pixel units including first to seventh subpixels arranged sequentially in a row direction, the first subpixel, the second subpixel, the third subpixel and the fourth subpixel being different from one another in color, and each subpixel among the first to third subpixels having a same color as that of one subpixel among the fifth to the seventh pixels, respectively.

In some examples, the first subpixel and the fifth subpixel are the same in color, the second subpixel and the sixth subpixel are the same in color, and the third subpixel and the seventh subpixel are the same in color.

In some examples, the color of the fourth subpixel is yellow, white or cyan.

In some examples, three adjacent fourth subpixels among the fourth subpixels in a same column are different from one another in color.

In some examples, as the fourth subpixels in a same row, yellow subpixels and cyan subpixels are alternatively arranged, or the fourth subpixels in the same row are all white.

In some examples, three adjacent fourth subpixels among the fourth subpixels in a same row are different from one another in color.

In some examples, the first subpixel, the second subpixel and the third subpixel are different from one another in color, and are one of red, green and blue, respectively.

In some examples, the pixel structure further comprises: a plurality of data lines connected with the fourth subpixels respectively, the data lines being used for applying data drive signals to the fourth subpixels.

An embodiment of the present invention further provides a display device, comprising the pixel structure described above.

The pixel structure and the display device provided by the embodiments of the invention comprise a plurality of pixel units arranged in a matrix, each pixel unit includes seven subpixels, namely, one subpixel is additionally arranged between every two pixels of the original pixel structure, the added subpixel has a color different from those of subpixels in two pixels on both sides of the added subpixel, so that the number of colors of the pixel structure become from the original three to at least four, the added subpixel is shared by the pixels on both sides thereof, the variety of colors shown can be enriched by color modulation, and gamut of the display device is improved.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
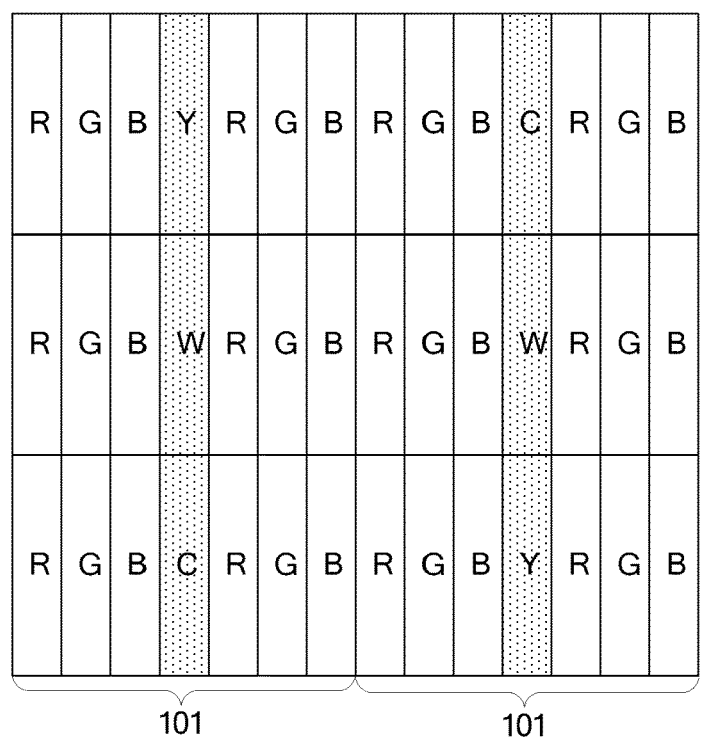
FIG. 1 is a pixel arrangement diagram of a pixel structure provided by an embodiment of the invention.

An embodiment of the invention provides a pixel structure, as illustrated in FIG. 1, including: a plurality of pixel units 101 arranged in a matrix, each pixel unit including first to seventh subpixels arranged sequentially in a row direction, wherein the first subpixel and the fifth subpixel are the same in color, the second subpixel and the sixth subpixel are the same in color, the third subpixel and the seventh subpixel are the same in color, and the first subpixel, the second subpixel, the third subpixel and the fourth subpixel are different from one another in color.

In the prior art, each pixel includes three subpixels of different colors, while in the pixel structure provided by the embodiment of the invention, based on the original pixel structure, a fourth subpixel of a different color is added between two pixels to form a pixel unit 101, which is equivalent to that two pixels positioned on both sides in each pixel unit 101 share the fourth subpixel positioned in the middle. As the fourth subpixels and the subpixels in the pixel units are different in color, during color display, color modulation can be realized by adjusting gray scales of the fourth subpixels and the subpixels around the fourth subpixels, so the picture display colors are more diversified, and gamut is improved.

Figure 2:
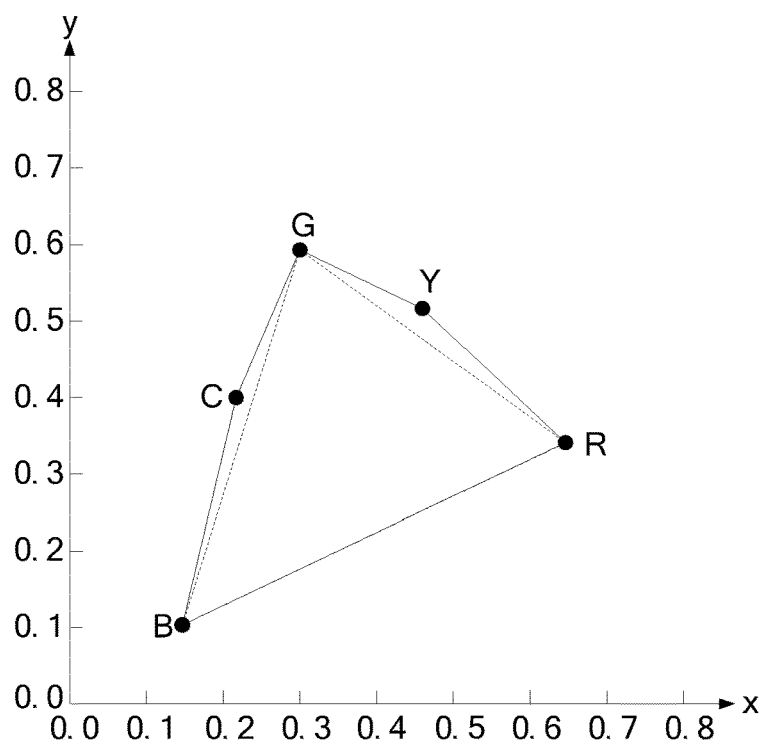
FIG. 2 is a contrast diagram of gamut realized by the pixel structures in the prior art and in the embodiment of the invention.

In the embodiment, the color of the fourth subpixel in each pixel unit can be yellow, white or cyan, and the fourth subpixels in different pixel units can be different in color. As illustrated in FIG. 2, in a CIE1931 coordinate graph, a region defined by a dotted line illustrates that the pixel structure in the prior art only has a gamut covered by three colors of red (R), green (G) and blue (B), a region defined by a solid line illustrates that the pixel structure in the embodiment of the invention comprises a gamut covered by red (R), green (G), blue (B), cyan (C) and yellow (Y), and it is obvious that the gamut capable of being displayed by the pixel structure in the embodiment is higher.

As the subpixels in yellow and cyan are added, the display of the pixel structure in the embodiment for yellow and cyan is more precise, and the retention capability for yellow and cyan is improved.

Figure 3:
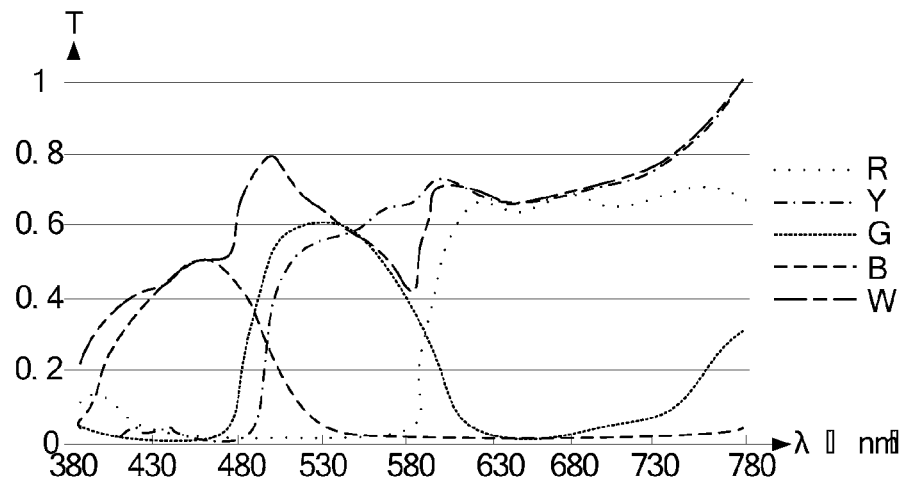
FIG. 3 is a graph showing change of light transmittance of subpixels in different colors with wavelength.

Light transmittance of the pixels can be improved by arranging the fourth subpixels in yellow or white in the pixel structure. As illustrated in FIG. 3, a horizontal axis λ is light wavelength, a vertical axis T is light transmittance, different line types represent change of the light transmittance of subpixels in different colors with wavelength, and it can be obtained by comparing respective curves that in visible light wave band (400-800 mm), the white and yellow subpixels are greater than the red, green and blue subpixels in light transmittance, so the pixel structure provided by the embodiment is larger than that in the prior art in light transmittance, and has higher picture display brightness. Further, in the prior art, the picture display brightness is usually increased by enhancing the brightness of a backlight module of the display device, but this manner not only increases power consumption, but also increases the brightness of a picture in a dark state, so that the picture contrast is reduced and display quality is reduced. In the embodiment, the light transmittance of the pixels is increased by arranging yellow and/or white subpixels in the pixel structure, so that the picture display brightness is improved under the premise that the power consumption is not increased and the contrast is not reduced.

Color temperature of a display picture is determined by spectrum of the pixels, and for the display device, in order to make eyes feel comfortable, it is required that the color temperature changes within a certain range, and changes with regions. For example, the comfortable color temperature for Europeans is 6500 K, and the comfortable color temperature for Asians is 9300 K. The cyan and yellow subpixels in the embodiment can achieve the functions of adjusting the color temperature and improving picture comfort level. Particularly, under certain backlight intensity, for a display device of a European consumer, the color temperature can be reduced by increasing aperture of the yellow subpixels, and for a display device of an Asian consumer, the color temperature can be reduced by increasing aperture of the cyan subpixels.

In some examples, three adjacent fourth subpixels among the fourth subpixels in a same column are different from one another in color (for example, the fourth subpixels in one column can be circularly arranged according to the sequence of yellow, white and cyan), so that the distance between the fourth subpixels of different colors are smaller than that between the fourth subpixels of a same color, namely, distribution of the fourth subpixels of different colors on screen are more uniform, color modulation is further improved and gamut of the display device is improved.

In some examples, the fourth subpixels in a same row can be alternatively arranged with yellow and cyan, or the fourth subpixels positioned in the same row are all white, as illustrated in FIG. 1. As the pixel structure is formed by arranging a plurality of repetitive regions, each repetitive region comprises a plurality of pixel units 101; under the above arrangement, each repetitive region comprises pixel units 101 of three rows and two columns, and FIG. 1 illustrates arrangement of one repetitive unit. In addition, the three adjacent fourth subpixels among the fourth subpixels in the same row can be different from one another in color (for example, the fourth subpixels in the same row can be circularly arranged according to the sequence of yellow, white and cyan, as illustrated in FIG. 4); at that time, each repetitive region of the pixel structure comprises pixel units 101 of three rows and three columns, and FIG. 4 illustrates the arrangement of one repetitive region.

It should be noted that in the embodiment, the first subpixel, the second subpixel and the third subpixel are different from one another in color and are respectively one of red, green and blue. As the first subpixel and the fifth subpixel are the same in color, the second subpixel and the sixth subpixel are the same in color, and the third subpixel and the seventh subpixel are the same in color, except the fourth subpixel in one pixel unit, colors of the first, second, third, fifth, sixth and seventh subpixels may be arranged in a sequence of red, green, blue, blue, green, and red; or red, blue, green, green, blue, and red; or green, red, blue, blue, red, and green; or green, blue, red, red, blue, and green; or blue, green, red, red, green, and blue; or blue, red, green, green, red, and blue; or the like.

Figure 4:
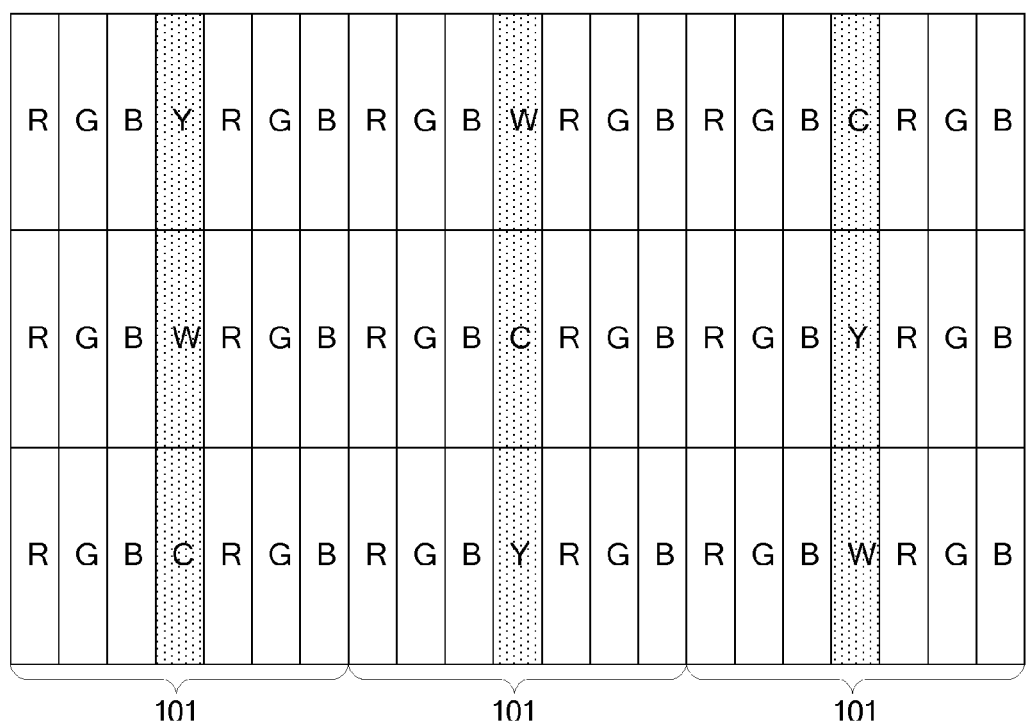
FIG. 4 is another pixel arrangement diagram of a pixel structure provided by the embodiment of the invention.

It should be noted that in the embodiments described according to the pixel arrangement diagrams as illustrated in FIG. 1 and FIG. 4, descriptions are made by taking a following case as example: the first subpixel and the fifth subpixel are the same in color, the second subpixel and the sixth subpixel are the same in color, and the third subpixel and the seventh subpixel are the same in color. However, the embodiments of the invention are not limited thereto. In each pixel unit, the color of each subpixel among the first to three subpixels is the same as one subpixel among the fifth to seventh subpixels. For example, the colors of the first, second, third, fifth, sixth and seventh subpixels may be arranged in a sequence of red, green, blue, green, blue, and red; or red, blue, green, blue, green, and red; or green, red, blue, red, blue, and green; or green, blue, red, blue, red, and green; or blue, green, red, green, red, and blue; or blue, red, green, red, green, and blue; or the like. In other words, the fourth subpixel is positioned in the middle position in a row direction, and three subpixels of different colors are arranged on both sides of the fourth subpixel. Three colors positioned on one side of the fourth subpixel and the three colors on the other side of the fourth pixel are the same, but the arrangement sequence of the three subpixels of different colors on both sides may be different.

The pixel structure provided by the embodiment can further comprise: a plurality of data lines connected with the fourth subpixels respectively, and the data lines are used for applying data drive signals to the fourth subpixels so as to enable the fourth subpixels to display desired gray scales. As the pixel structure in the embodiment is equivalent to that one fourth subpixel is added between two adjacent pixels to form a pixel unit with seven subpixels, the number of data lines needed by the pixel structure in the embodiment is increased by one sixth of the data lines in the prior art.

Based on the above pixel structure, the embodiment further provides a display device, comprising the pixel structure described above, and the display device in the embodiment has the advantage of high gamut. Further, the color of the fourth subpixel in each pixel unit are set as yellow, cyan or white, and the yellow or white subpixels are higher than the red, green and blue subpixels in light transmittance, so that the light transmittance of the device is improved and picture display brightness is enhanced under the premise that power consumption is not increased and picture contrast is not reduced; moreover, the retention capability of the device on yellow and cyan can be improved by arranging the yellow and cyan subpixels; in addition, the display device can also achieve an effect that the color temperature can be adjusted by adjusting the apertures of the yellow or white subpixels for consumers in different regions, so that a picture displayed by the display device in the embodiment gives a more comfortable feeling to people.

It should be explained that the display device in the embodiment can be a liquid crystal panel, electronic paper or an organic light-emitting diode (OLED) panel and can be applied to products or parts, such as a cellphone, a tablet computer, a television, a display, a laptop, a digital frame and a navigator with a display function.

The foregoing embodiments merely are exemplary embodiments of the invention, and not intended to define the scope of the invention, and the scope of the invention is determined by the appended claims.

The application claims priority of Chinese Patent Application No. 201410445915.3 filed on Sep. 3, 2014, the disclosure of which is incorporated herein by reference in its entirety as part of the present application.

What is claimed is:

1. A pixel structure, comprising: a plurality of repetitive regions, each of the repetitive regions comprising a plurality of pixel units arranged in a matrix having three rows and three columns, each of the pixel units including first to seventh subpixels arranged sequentially in a row direction, the first subpixel, the second subpixel, the third subpixel and the fourth subpixel being different from one another in color, and each subpixel among the first to third subpixels having a same color as that of a respective one subpixel among the fifth to the seventh subpixels, wherein three adjacent fourth subpixels among fourth subpixels in a same column are different from one another in color, and fourth subpixels in a row are arranged according to a repeated sequence of yellow, white and cyan, and the fourth subpixels in the same column are arranged according to a repeated sequence of yellow, white and cyan, and wherein a color temperature of a picture displayed by the pixel structure is adjusted by increasing an aperture of yellow subpixels and/or by increasing an aperture of cyan subpixels.

2. The pixel structure according to claim 1, wherein, the first subpixel and the fifth subpixel are the same in color, the second subpixel and the sixth subpixel are the same in color, and the third subpixel and the seventh subpixel are the same in color.

3. The pixel structure according to claim 2, wherein, the first subpixel, the second subpixel and the third subpixel are different from one another in color, and are a respective one of red, green and blue.

4. The pixel structure according to claim 1, wherein, the first subpixel, the second subpixel and the third subpixel are different from one another in color, and are a respective one of red, green and blue.

5. The pixel structure according to claim 4, further comprising: a plurality of data lines connected with the fourth subpixels, the data lines being used for applying data drive signals to the fourth subpixels.

6. A display device, comprising the pixel structure according to claim 1.

7. The display device according to claim 6, wherein, the first subpixel and the fifth subpixel are the same in color, the second subpixel and the sixth subpixel are the same in color, and the third subpixel and the seventh subpixel are the same in color.

8. The display device according to claim 6, wherein, the first subpixel, the second subpixel and the third subpixel are different from one another in color, and are a respective one of red, green and blue.

9. The display device according to claim 8, further comprising: a plurality of data lines connected with the fourth subpixels, the data lines being used for applying data drive signals to the fourth subpixels.

10. The pixel structure according to claim 1, wherein the color temperature of the picture is adjusted to 6500K.

11. The pixel structure according to claim 1, wherein the color temperature of the picture is adjusted to 9300K.

12. The pixel structure according to claim 1, wherein the first subpixel and the fifth subpixel of each of the pixel units are red, the second subpixel and sixth subpixel of each of the pixel units are green, the third subpixel and the sixth subpixel of each of the pixel units are blue, the fourth subpixels of a first pixel unit, a second pixel unit and a third pixel unit of a first row of pixel units of each of the repetitive regions are yellow, white and cyan, respectively, the fourth subpixels of a first pixel unit, a second pixel unit and a third pixel unit of a second row of pixel units of each of the repetitive regions are white, cyan and yellow, respectively, and the fourth subpixels of a first pixel unit, a second pixel unit and a third pixel unit of a third row of pixel units of each of the repetitive regions are cyan, yellow and white, respectively.

* * * * *